United States Patent [19]

Cannon et al.

[11] 4,146,577

[45] Mar. 27, 1979

[54] PROCESS OF PRODUCING A SULFONATE OF SODIUM, POTASSIUM, OR CALCIUM

[75] Inventors: Curtis W. Cannon, San Diego, Calif.; Chung-Kong Chow, Hobbs, N. Mex.

[73] Assignee: Climax Chemical Company, Hobbs, N. Mex.

[21] Appl. No.: 591,837

[22] Filed: Jun. 30, 1975

[51] Int. Cl.$^2$ .............................................. C01B 17/45
[52] U.S. Cl. .................................... 423/467; 423/506; 423/539
[58] Field of Search ........................ 423/467, 506, 539

[56] References Cited

U.S. PATENT DOCUMENTS

| | | | |
|---|---|---|---|
| 2,218,729 | 10/1940 | Tauch et al. | 423/467 |
| 2,219,103 | 10/1940 | Iler | 423/467 |
| 2,276,041 | 3/1942 | Iler | 423/467 |
| 2,354,464 | 7/1944 | Laury | 423/467 |
| 2,441,550 | 5/1948 | Hixson et al. | 423/506 X |
| 2,832,667 | 4/1958 | Muetterties | 423/467 |

FOREIGN PATENT DOCUMENTS 644222  4/1937  Fed. Rep. of Germany.

OTHER PUBLICATIONS

Industrial and Engineering Chemistry, Dec. 1941, pp. 1472–1484, vol. 33, No. 12, article by Arthur W. Hixson et al.

*Primary Examiner*—G. O. Peters
*Attorney, Agent, or Firm*—Vinson & Elkins

[57] ABSTRACT

The process of reacting a metallic halide (which metal is sodium, potassium or calcium) with sulfur trioxide including dispersing the metallic halide in the presence of an excess of sulfur trioxide or sulfur dioxide, as a dispersant, to enable handling the mixture as a slurry, completing the reaction to form the desired metallic halogen sulfonate, decomposing the metallic halogen sulfonate before or after an intermediate step to remove excess sulfur trioxide and sulfur dioxide, using combustion of sulfur to supply the heat to vaporize excess sulfur trioxide and sulfur dioxide present, and to decompose the metallic halogen sulfonate to yield the halogen, sulfur dioxide, and the sulfate of the metal, separating the metallic sulfate from the gaseous products, and separating the halogen from the sulfur trioxide and sulfur dioxide in the gaseous products by extractive distillation, or alternately treating organic material under anhydrous conditions with the metallic halogen sulfonate or its decomposition products, to halogenate or oxidize the organic material.

8 Claims, 3 Drawing Figures

PROCESS OF PRODUCING A SULFONATE OF SODIUM, POTASSIUM, OR CALCIUM

BACKGROUND OF THE INVENTION

It has long been recognized that in a proposed method for production of chlorine by reacting sulfur trioxide with salt (sodium chloride) a possible intermediate product is sodium chloro-sulfonate. Some prior processes claim to have avoided the production of the intermediate product by conducting the reaction at a sufficiently high temperature so that the sodium sulfate, chlorine and sulfur dioxide are produced directly.

H. F. Johnstone in his article "Chlorine Production — Nonelectrolytic Processes" in the September 1948 issue of *Chemical Engineering Progress* (page 657, et seq.) reviews this process using sodium chloride as the metallic halide and points out that at room temperature the ratio of sulfur trioxide to sodium chloride is greater than 2.0 and below 110° C. a definite compound NaCl-$(SO_3)_2$ may be formed. He further states that the mono chloro-sulfonate is stable between 110° C. and 225° C. above which temperature range it begins to decompose to pyrosulfate and chlorine with the evolution of chlorine and sulfur dioxide. He further points out that the initial reaction of the sulfur trioxide with salt is exothermic and that the decomposition reaction of the sodium chloro-sulfonate is endothermic. Johnstone suggests that the production of the sodium chloro-sulfonate requires jacketed and cooled reactors to maintain the temperatures below the decomposition temperatures since a large amount of heat is liberated in the reaction. With respect to decomposition he mentions that others have suggested that because chloro-sulfonate has a tendency to foam and become pasty the use of salt cake reactors may become impossible. Further, he discusses and explains the difficulties in the separation of the sulfur dioxide and chlorine produced by the process.

N. A. Laury in his U.S. Pat. No. 2,254,014 suggests that the decomposition of sodium chloro-sulfonate at temperatures between 150-350° C. forms sodium pyrosulphate (which can be neutralized with sodium carbonate) and thionyl chloride which reacts with air to form sulfur dioxide and chlorine. Laury suggests that the sulfur dioxide and chlorine can be passed to a catalytic reactor with additional sulfur dioxide and oxygen to form sulfur trioxide and chlorine but cautions that a chlorine resistant catalyst should be used.

A. W. Hixson, et al in their U.S. Pat. No. 2,441,550 suggest the reaction of salt and sulfur trioxide and also the step of converting sulfur dioxide to sulfur trioxide, cooling the sulfur trioxide, absorbing it in oleum and thereafter heating the oleum to release the sulfur trioxide for the reaction with the salt. The article "Chlorine and Salt Cake from Salt and Sulfur" by A. W. Hixson and A. H. Tenney in the December, 1941 issue of *Industrial and Engineering Chemistry* reports that reactions of sulfur trioxide and sodium chloride took 96 hours at room temperature and 23 hours at 60° C. They also suggest that the intermediate product, sodium chloro-sulfonate, may be valuable as a sulfonating agent.

A. W. Hixson, et al in their U.S. Pat. No. 2,553,767 suggest that the separation of sulfur dioxide and chlorine is to be accomplished by reacting the sulfur dioxide with a material which is inert to chlorine and with which sulfur dioxide forms an addition compound, from which the sulfur dioxide may be evolved or liberated by elevation of temperature. The patent suggests that anhydrous aluminium chloride could be used.

In a report entitled "The Separation of Sulfur Dioxide and Chlorine" dated Dec. 20, 1944 for the Office of Production Research and Development of the War Production Board with the University of Wisconsin by Olaf A. Hougen, the difficulties of separating sulfur dioxide from chlorine and many of the various processes that might be tried for such separation are discussed.

From these publications it is readily apparent that the proposed process for the production of chlorine by the reaction of sulfur trioxide and sodium chloride is fraught with many problems. Further applicants are not aware of any commercial venture which has used this reaction for the production of chlorine, even through knowledge of the reaction has been available for many years.

SUMMARY

The present invention relates to a process for reacting sulfur trioxide with a metallic halide which reaction is carried on by dispersing the metallic halide in an excess of liquid dispersant such as excess sulfur trioxide or sulfur dioxide including at least a sufficient amount of sulfur trioxide for the desired reaction, so that the reacting mixture can be handled as a liquid or slurry with some excess liquid evaporating to control reaction temperature, separating the intermediate product of metallic halogen sulfonate from the excess sulfur trioxide or sulfur dioxide dispersant, or alternatively delivering the reactant mixture with the metallic halogen sulfonate to a decomposition zone wherein it is heated to decompose the metallic halogen sulfonate to metallic sulfate, sulfur dioxide, and the halogen, and to vaporize sulfur trioxide and sulfur dioxide, preferably using sulfur combustion as a source of heat and additional sulfur dioxide, separating the halogen and sulfur dioxide gases by extractive distillation utilizing sulfur trioxide or other suitable solvent as the extractant, and separating the sulfur trioxide and sulfur dioxide components. Alternately the metallic halogen sulfonate can be used to treat organic material directly to halogenate or oxidize the organic material. The exothermic halogenation or oxidation may serve as a source of heat to decompose the metallic halogen sulfonate.

An object of the present invention is to provide an improved process for reacting sulfur trioxide with a metallic halide which reaction rapidly goes to completion.

Another object of the present invention is to provide an improved process for reacting a metallic chloride with sulfur trioxide to form an intermediate metallic chlorosulfonate in a sufficiently short time to be commercially applicable.

A further object is to provide an improved process for reacting a metallic chloride with sulfur trioxide to produce chlorine which incorporates an improved process for separating the chlorine and sulfur dioxide produced from the reactions.

A still further object is to provide an improved process for reacting a metallic halide with sulfur trioxide that avoids the handling problems of pasty and sticky masses.

A still further object of the present invention is to provide an improved process for reacting a metallic chloride with sulfur trioxide to form free chlorine which process utilizes the heat of combustion of sulfur to supply the heat of decomposition.

A further object is to provide an improved process for reacting a metallic halide and sulfur trioxide to form a metallic halogen sulfonate for reacting with an organic material.

A further object is to provide an improved process for separating sulfur dioxide and chlorine.

Still another object is to provide an improved process of economically decomposing a metallic halogen sulfonate.

Still another object of the present invention is to provide a thermal process for the manufacture of chlorine so that the cost of utility heat and electric power is substantially reduced.

Another object is to provide an improved process for reacting a metallic halide and sulfur trioxide to form a metallic halogen sulfonate which is decomposed by heat wherein the combustion supplying such heat supplies both sulfur dioxide for the sulfur trioxide manufacture process and energy requirements of the process.

BRIEF DESCRIPTION OF THE DRAWINGS

These and other objects and advantages of the present invention are hereinafter disclosed in detail with reference to the description of the drawings wherein.

DESCRIPTION OF THE PREFERRED EMBODIMENTS

Figure 1:
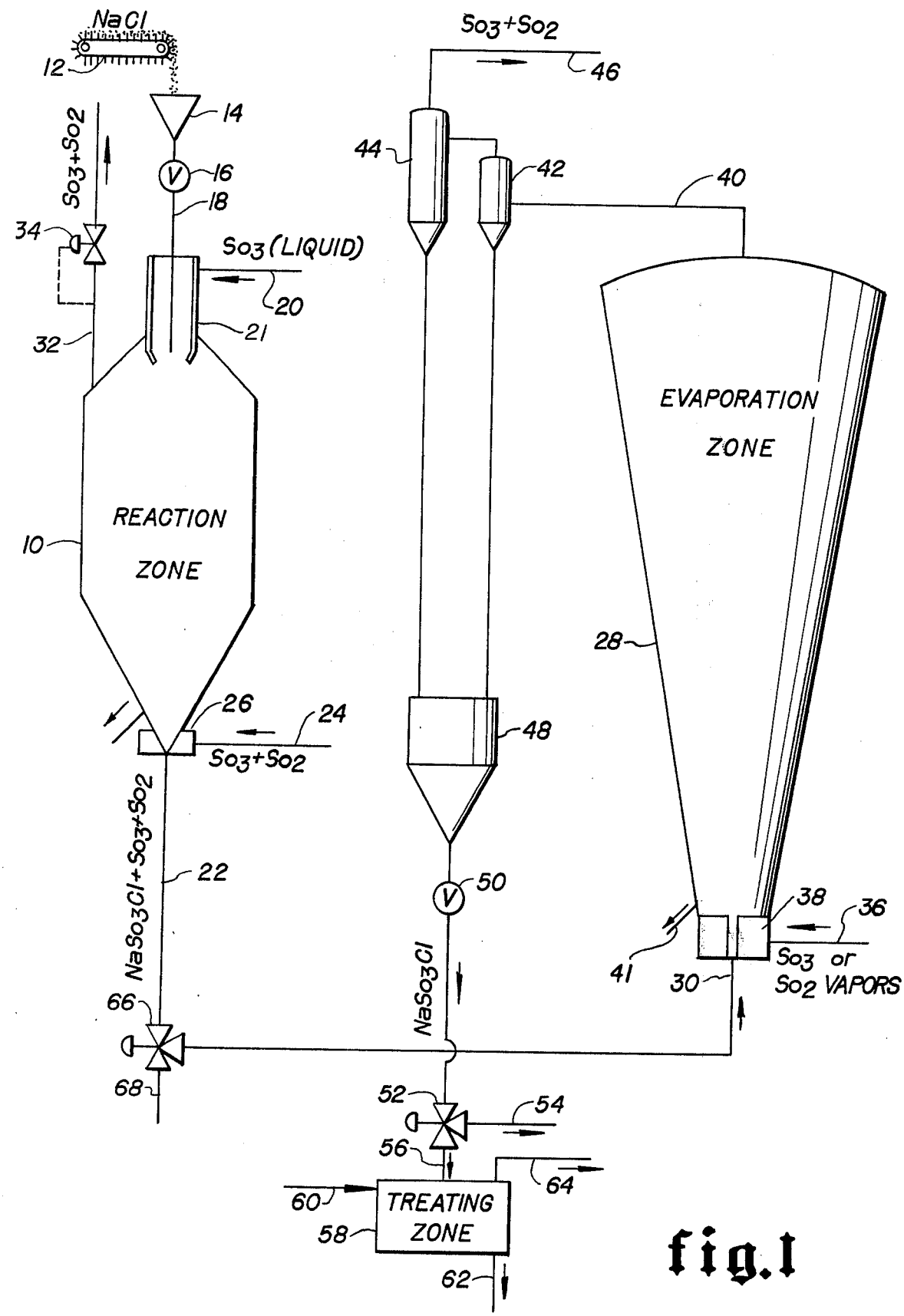
FIG. 1 is a schematic flow diagram of the improved process of the present invention for producing a dried metallic halogen sulfonate.

The present invention has application to reacting a metallic halide with sulfur trioxide. The metallic halides which are intended to be included hereunder are sodium halide, potassium halide and calcium halide. The preferred form of the invention which is hereinafter described with reference to the drawings utilizes sodium chloride. The reaction of the sodium chloride with sulfur trioxide forms sodium chloro-sulfonate under controlled conditions as hereinafter set forth. The equations for such reactions are:

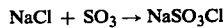

NaCl + SO$_3$ → NaSO$_3$Cl

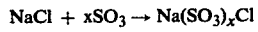

NaCl + xSO$_3$ → Na(SO$_3$)$_x$Cl

It is preferred that the reaction be carried out at a temperature below 150° C. (302° F.). Sulfur trioxide and sulfur dioxide have significant vapor pressure so pressure is desirable to the extent the salt feeding mechanism can function properly, since pressure will let the reaction be carried out at higher temperatures. Such reaction is exothermic. In order to produce the sodium chloro-monosulfonate the final temperature of the product should be maintained within the range from 110° C. (230° F.) to 225° C. (437° F.). Also, it is of utmost importance to assure commercial acceptance that this reaction progress rapidly in a fluid dispersion to avoid handling problems with sticky or pasty materials. The present invention has solved these problems by conducting the reaction of the sulfur trioxide and sodium chloride by dispersing the sodium chloride in the presence of an excess of liquids relatively inert to sulfonation, such as excess sulfur trioxide or sulfur dioxide to conduct the reaction in a slurry or liquid state. Some of the excess liquids are vaporized and the heat of such vaporization counterbalances the heat developed by the reaction to assist in maintaining the reacting material's temperature within the desired limits so that the reaction proceeds rapidly. Vaporized sulfur trioxide and sulfur dioxide can of course be recycled as appropriate. Care should be taken to assure that sufficient sulfur trioxide is provided for the desired reaction with the sodium chloride.

In accordance with the present invention the reaction mixture may be processed by separating the excess liquids to produce a dry sodium chloro-sulfonate product or the reaction mixture may be delivered to the decomposition zone in the liquid or slurry form wherein sufficient heat is added to vaporize the excess sulfur trioxide and sulfur dioxide and decompose the sodium chloro-sulfonate. The removal of excess liquids, such as excess sulfur trioxide or sulfur dioxide, from the sodium chloro-sulfonate may be by contacting with hot vapors or gases such as sulfur dioxide or sulfur trioxide in a fluo-solids type apparatus, by spray drying, or by any other suitable drying or evaporation process. The temperature of the evaporation of the excess liquids can be regulated to produce the desired degree of sulfonation but should be controlled to be below the lowest temperature at which decomposition of the metallic chloro-sulfonate occurs when the metallic chlorosulfonate is desired as a product.

A particular advantage of producing the intermediate product of sodium chloro-sulfonate which has not previously been recognized or suggested is that such product may be reacted with an organic material to chlorinate or oxidize the organic material in a manner substantially similar to the reaction of such material with chlorine. The only known reference to the use of sodium chloro-sulfonate suggests that it is useful as a sulfonating agent as hereinbefore mentioned. It has been found that the sodium chloro-monosulfonate and in some instances even sodium chloro-sulfonate having higher sulfur trioxide ratios to the chloride salt (which ratios are less than two) will chlorinate organic materials without appreciable sulfonation taking place. The organic material to be reacted with the sodium chlorosulfonate and the organic derivatives produced preferably should be of a type inert or relatively non-reactive to sulfur dioxide but subject to halogenation or oxidation by a halogen.

In the treating of the organic material with the intermediate product in accordance with the present invention the conditions of the reaction are maintained anhydrous and made to simulate the composition and temperature conditions which are known to apply for the specific treatment of the organic material with the respective halogen. The low volatility of sodium chloro-sulfonate permits it to be used at atmospheric or lower pressures than chlorine itself, which simplifies the required reaction equipment.

Typical examples of the organic materials which may be treated with the intermediate reaction product (sodium chloro-sulfonate) of the present invention are as follows: paraffin compounds such as methane, ethane, propane, etc., may be treated to manufacture the chlorinated derivative such as methyl chloride, methylene chloride, chloroform, carbon tetrachloride, perchloroethylene etc.; an olefin compound such as ethylene, propylene, butylene, etc., to manufacture chlorinated derivatives such as ethylene dichloride, vinyl chloride, etc.; and an aromatic compound such as benzene, toluene, naphthalene, etc. to manufacture the chlorinated derivatives such as mono-chlorobenzene, dichlorobenzene, chlorinated toluene, etc. Ethane and ethylene both may be treated with sodium chloro-sulfonate to produce vinyl chloride. Applicable paraffins are herein designated light paraffins. As used herein the term light paraffins shall include methane, ethane, propane, butanes, and pentanes.

In treating such organic materials the proportions of the organic material to the sodium chloro-sulfonate may be varied to produce different products and yields as is commonly done in chlorinating such organic materials. For example, methane may be treated to produce varying yields of carbon tetrachloride, chloroform, methylene chloride and methyl chloride.

The sodium chloro-sulfonate may be reacted with the organic material directly or in the presence of carrying media such as liquid sulfur dioxide where the carrying media is relatively inert to the organic material. Such media can be further used to rinse or extract the organic product from the sulfate salt. The sulfate product, if water soluble, may be separated from the organic product if, the organic product is insoluble, by dissolving the salt, or the organic product may be vaporized from the salt and condensed if it is stable at the required temperature, or any other means normally used for the separation of such products may be used.

When treating the organic material with other metallic halogen sulfonates such as calcium fluoro-sulfonate, the reaction conditions should be maintained to approximate the preferred reaction conditions which are used for the respective halogenation reactions.

When it is desired to produce chlorine and market grade sodium sulfate the sodium chloro-sulfonate is delivered to a decomposition zone wherein the temperature is maintained between 510° C. (950° F.) and 675° C. (1250° F.). The temperature in the decomposition zone can be maintained within the above limits by introducing sulfur and oxygen for the combustion directly in the decomposition zone to generate the needed heat for the decomposition. This obviates the need for high temperature burners as the heat is dissipated by contact with the decomposing material.

The products of such decomposition are the sulfur dioxide resulting from the sulfur burning, sulfur dioxide, chlorine and sodium sulfate resulting from the decomposition of the sodium chloro-sulfonate and, the sulfur trioxide and sulfur dioxide excess that may have accompanied the feed, particularly if it has been introduced to the decomposition zone as a slurry. It is preferred that the oxygen supplied to the decomposition zone be provided free of other gases so that the chlorine produced does not have to be separated from significant quantities of non-condensable gases.

The solid sodium sulfate produced in the decomposition is readily separated by conventional means from the gases produced and is delivered to suitable storage. The gases including chlorine, sulfur dioxide and possible sulfur trioxide are then delivered to a separation zone wherein the chlorine is separated by a suitable process such as extractive distillation. The separation by extractive distillation has particular related process application when the extractant used is sulfur trioxide. The extractive distillation may be advantageously operated in conjunction with a suitable converter for converting sulfur dioxide to sulfur trioxide to supply the extractant, the sulfur trioxide for the initial reaction with sodium chloride, and for heat exchange such as in the evaporative or distillation processes. Such process for the separation of sulfur dioxide and chlorine has particular application to the separation of the decomposition products from sodium chloro-sulfonate, but also has application to the separation of sulfur dioxide and chlorine occurring as a product mixture from this or other processes. Many useful heat transfers can be made within the processes both by direct contact, and by indirect means such as heat exchangers, as will be evident to those engineering the process.

The improved processes of the present invention have been described above generally, with reference to their advantages. The drawings illustrate the preferred forms of these processes. The flow diagram shown in FIG. 1 illustrates the process as it applies to the reaction of sulfur trioxide and sodium chloride to produce sodium chloro-sulfonate. The sodium chloride is delivered in measured quantities to reaction vessel 10 by the weight balanced belt 12, the hopper 14, the star feeder 16 and inlet 18 into reaction vessel 10 all of which equipment is suitable for handling the salt as solid particles as shown in FIG. 1. Liquid sulfur trioxide is delivered through line 20 and sparger 21 into reaction vessel 10 in a surrounding volute-like relationship to the sodium chloride entering therein to assure complete mixing and reaction between the components. Within reaction vessel 10 the sodium chloro-sulfonate produced and the excess liquid sulfur trioxide and sulfur dioxide form a slurry which is discharged from the vessel 10 through outlet 22. Excesses of liquid sulfur trioxide and sulfur dioxide desired to be present in the reaction zone of vessel 10 are delivered through inlet 20 to provide sufficient liquid body to maintain the desired consistency. Line 24 connects into the chamber 26 for introduction of sulfur trioxide or sulfur dioxide which vaporize to agitate the reacting mixture and remove excess heat. The gases generated within vessel 10 are discharged through outlet 32 under control of back pressure valve 34 to maintain reaction temperature. The elevation of vessel 10 with respect to evaporation vessel 28 can be used to provide sufficient liquid head to transfer the reaction mixture in vessel 10 through inlet 30 into the evaporation vessel 28 which in FIG. 1 is shown as a fluo-solids contacting vessel. The sulfurous oxide gases from both vessel 28 and vessel 10 may be recycled to the process or the sulfur trioxide manufacturing step as appropriate.

As previously mentioned spray driers or other suitable equipment may be used but the evaporation vessel 28 shown is a fluo-solids type of evaporator to which hot sulfur dioxide or sulfur trioxide is supplied through line 36 and are delivered into vessel 28 through the sparger 38. The temperature within the evaporation zone is advantageously controlled at approximately 400° F. for the manufacture of sodium chloro-sulfonate but may be higher with higher pressures. The function of the evaporation vessel is to remove the excess sulfur trioxide and sulfur dioxide from the solid reaction product, sodium chloro-sulfonate. The range of temperature to be maintained within evaporation vessel 28 is preferred to be between 300° F. and 425° F. if the monosodium chloro-sulfonaate is desired.

It is preferred that hot sulfur trioxide or sulfur dioxide vapors be used as the heat source for the evaporation because of their chemical identity with the material vaporized.

The vaporized sulfur trioxide and sulfur dioxide and the sodium chloro-sulfonate are withdrawn from the evaporation vessel 28 through the upper outlet 40 although a bottom product withdrawal 41 may be utilized. The gases are separated from the solid intermediate product in the cyclone separators 42 and 44. A bottom draw 41 lump eliminator should be incorporated in an upflow fluo-solids apparatus. The gases, sulfur dioxide and sulfur trioxide, are discharged through line 46. The sodium chloro-sulfonate is delivered from the separators 42 and 44 to the hopper 48. The sodium chloro-sulfonate is discharged by star feeder 50, valve 52 through line 54 to suitable storage (not shown), or to a decomposition zone hereinafter discussed.

Valve 52 can also direct the sodium chloro-sulfonate through line 56 to an organic contacting apparatus 58 wherein organic feed materials are delivered through the inlet 60 and the various products of such treatment are discharged therefrom through the outlets 62 and 64. The products of such organic treating step may be separated from the salt product by conventional processes. While the treating of the organic material in contacting apparatus 58 is a schematic example of the addition of the sodium chloro-sulfonate to an organic material to chlorinate or oxidize the organic material, the various usual types of reaction mechanisms, as appropriate, may be used, such as for example, a fluo-solids reactor to contact a gaseous organic material and the sodium chloro-sulfonate, or an agitated vessel for contacting liquid organic materials with the sodium chloro-sulfonate, or a vessel for contacting a solid organic material with the sodium chloro-sulfonate in slurry form. The valve 66 which connects to the outlet 22 from the reaction vessel 10 can divert the slurry to the line 68 which may be connected to any type organic material reactor when the sodium chloro-sulfonate is desired to be in slurry form for the organic material treatment. Also, the line 68 may be connected to deliver slurry to a decomposition vessel directly to eliminate the separate step of removing the excess sulfur trioxide and sulfur dioxide.

Figure 2:
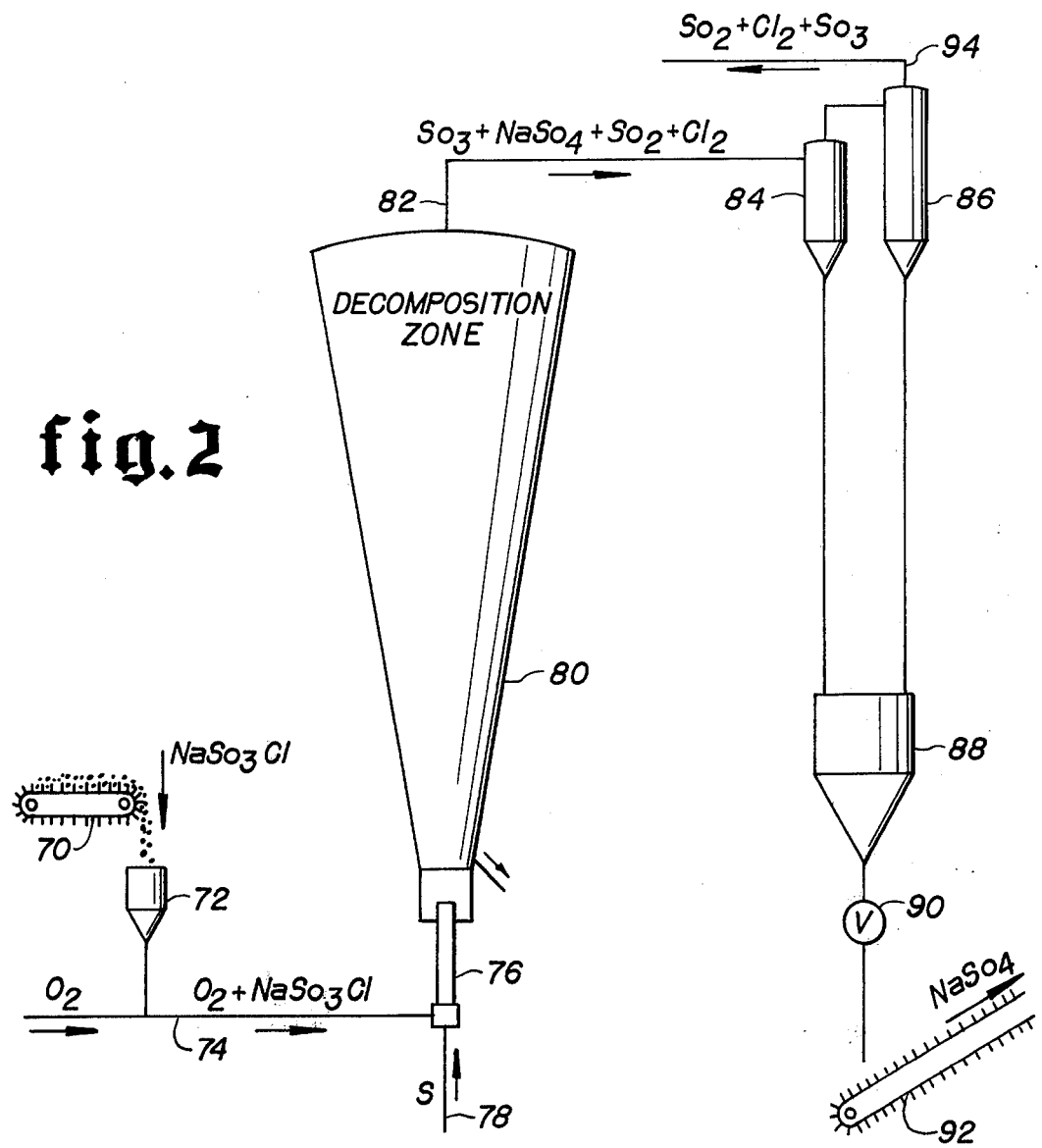
FIG. 2 is another schematic flow diagram showing the improved decomposition process for decomposing a metallic halogen sulfonate.

The decomposition of the metallic halogen sulfonate (sodium chloro-sulfonate in the example herein) is preferred to be conducted in apparatus such as is shown in FIG. 2. The solid sodium chloro-sulfonate is metered into the decomposition process on the weight sensitive belt 70 through the hopper 72 and into line 74. Oxygen (preferably free of other gases) is supplied through line 74 with sufficient velocity to entrain the solid sodium chloro-sulfonate particles to deliver them to the inlet sparger 76 which introduces the oxygen, the sodium chloro-sulfonate and molten sulfur from line 78 into the interior of decomposition vessel 80. In vessel 80 the temperature which is controlled by the combustion of the sulfur and oxygen therein is maintained at approximately 1100° F. The supply of the sulfur and oxygen is metered to produce the heat needed to complete the decomposition of the sodium chloro-sulfonate. The sulfur is shown to be metered and delivered through line 78 in molten form but may be supplied as a regulated vapor. The temperature within the decomposition zone is maintained within the range from 950° F. to 1250° F. The products of combustion and decomposition are discharged from vessel 80 through the outlet 82 and through the cyclone separators 84 and 86 wherein the solid product, sodium sulfate, is separated from the gases. A bottom draw reactor can be used and should be incorporated for lump removal. The sodium sulfate is cooled and collected in hopper 88 and is discharged through the star feeder 90 onto the belt 92 for delivery to suitable storage or shipping facilities (not shown). The gases are discharged from separator 86 through line 94. Such gases normally will be sulfur dioxide and chlorine and any excess sulfur trioxide which is delivered to the vessel 80. These gases are separated to provide marketable chlorine.

Figure 3:
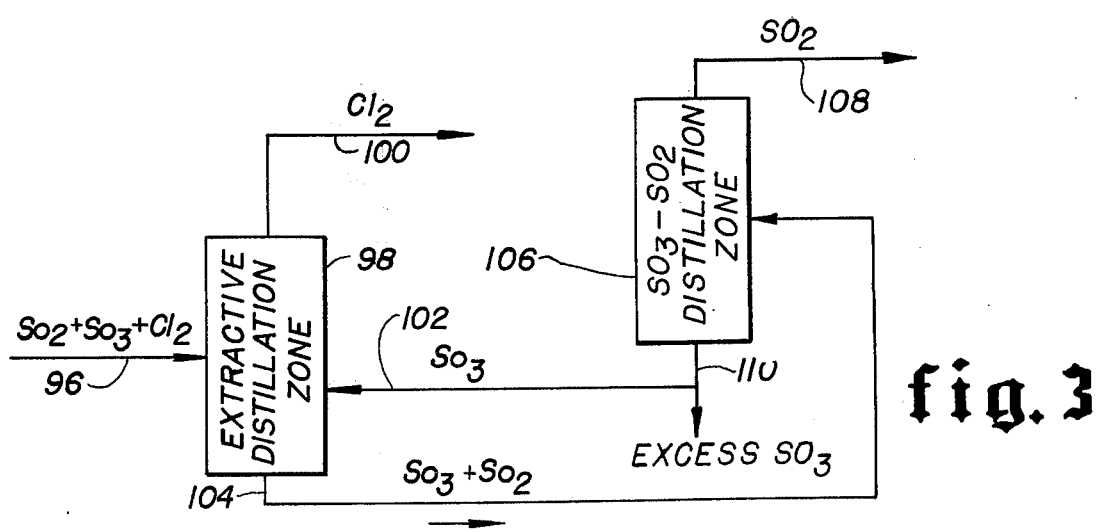
FIG. 3 is a schematic flow diagram of the extractive distillation process of the present invention for improved separation of sulfur dioxide and chlorine.

One suitable separation system for separating the chlorine from the sulfur dioxide is schematically shown in FIG. 3. The gas mixture stream to be processed, such as the gases from line 94 in FIG. 2 are delivered through line 96 into extractive distillation vessel 98. With suitable controls chlorine is discharged from the top of vessel 98 through outlet 100 and is condensed as reflux and product. The extractant (sulfur trioxide) is delivered to vessel 98 through inlet 102. The extractant functions to suppress the sulfur dioxide vapor pressure and breaks the sulfur dioxidechlorine azetrope thus allowing the chlorine to be separated. The bottom product, sulfur dioxide and sulfur trioxide mixture is discharged from the lower portion of vessel 98 through outlet 104 and conducted to the distillation vessel 106. Within vessel 106 sulfur dioxide is separated by distillation from the sulfur trioxide and the sulfur dioxide is discharged from the top of vessel 106 through the outlet 108 for liquefaction or conversion to sulfur trioxide and the sulfur trioxide substantially free of sulfur dioxide is conducted through bottom outlet 110 to inlet 102 to recycle to the extractant distillation column 98 or to reaction vessel 10 or other suitable use.

In such extraction distillation process an intermediate reflux may be used to provide a substantial heat removal in the area near the extractant feed. Because of the low boiling point of chlorine, such intermediate reflux is advantageous since it aids the separation of the chlorine and the sulfur dioxide and is more economical than a chlorine reflux at the top of the extractive distillation zone. When sulfur trioxide is used as the extractant the amount of chlorine reflux needed to separate the chlorine from the sulfur trioxide is minimized because small amounts of sulfur trioxide contained in the chlorine may be removed by contact with a controlled amount of water to form concentrated sulfuric acid in which chlorine is relatively insoluable.

With respect to the dispersing step of the metallic halide and the sulfur trioxide in a liquid or slurry form, the example of the carrier set forth above is liquid sulfur dioxide. The use of the liquid sulfur dioxide as the inert carrier at low pressures may be disadvantageous because of the low temperatures which must be provided to condense the sulfur dioxide. In such applications higher boiling inert carriers such as carbon tetrachloride may be used.

From the foregoing it can be seen that the present invention provides improved processes for the reacting of metallic halides with sulfur trioxide to produce a metallic halogen sulfonate which may be reacted with an organic material to either halogenate or oxidize the organic material. The metallic halide sulfonation reaction is conducted in a liquid or slurry form to provide excellent contact without the usual problems of sticky and pasty materials. The evaporation of the liquids from the reacting mixture provides a convenient manner of controlling the temperature of the reaction without problems which are inherent in heat exchange equipment with materials of this kind. The process also provides the metallic halogen sulfonate in liquid or granule form for carrying out diverse halogenation or oxidation reactions with organic materials, or the metallic halogen sulfonate is readily decomposed into the halogen, sulfur dioxide and metallic sulfate advantageously by supplying the heat of decomposition by the combustion of sulfur with oxygen. The process further has solved the problem of separating chlorine from sulfur dioxide by utilizing extractive distillation in which sulfur trioxide is used as the extractant so that the chlorine may be separated free of sulfur dioxide and can be liquified for storage or other use.

What is claimed is:

1. A process of reacting a metallic halide with liquid sulfur trioxide including the steps of
    dispersing a granular metallic halide into a substantial excess of a liquid as a dispersant consisting of either sulfur trioxide or the combination of sulfur trioxide and sulfur dioxide in a reaction zone whereby there is formed a metallic halo-sulfonate,
    the metals of said metallic halide being selected from the group consisting of sodium, potassium and calcium,
    the halides being selected from the group consisting of chlorides, bromides and iodides, and
    controlling the excess of said liquid dispersant to maintain the reactants dispersed in a slurry, whereby the reaction goes to substantial completion.

2. The process according to claim 1 wherein the reaction temperature is maintained by evaporation of a portion of the excess liquid.

3. The process according to claim 1 wherein the liquid dispersant is sulfur trioxide, and such excess sulfur trioxide not required in the reaction is vaporized and condensed for reuse in the process.

4. The process according to claim 1 wherein the metallic halide is sodium chloride, and the excess liquid is vaporized by heating the residual sodium chloro-sulfonate within a final temperature range of 110° C. to about 225° C.

5. The process according to claim 1 wherein the metallic halide is potassium chloride, and the excess liquid is vaporized by heating the residual potassium chloro-sulfonate within a final temperature range of 110° C. to about 225° C.

6. The process according to claim 1 including separating the metallic halo-sulfonate reaction product from the excesses of said liquid sulfur trioxide or combination of sulfur trioxide and sulfur dioxide.

7. The process according to claim 1 wherein said separating step includes
    washing the excess liquid from the metallic halogen sulfonate with sulfur dioxide, and
    recovering the sulfur dioxide.

8. The process according to claim 1 wherein the sulfur dioxide component of said liquid is unreactive to sulfur trioxide but present in sufficient amount to lower the evaporation temperature during the reaction and lower the solidification point of the sulfur trioxide at the prevailing pressures.

* * * * *